Sept. 22, 1964 L. J. GEHL 3,149,375
APPARATUS AND METHOD FOR MOLDING CUP-SHAPED BODIES
Filed April 18, 1961 2 Sheets-Sheet 2

INVENTOR.
LAWRENCE J. GEHL
BY Clarence R. Patty, Jr.
ATTORNEY 3,149,375
APPARATUS AND METHOD FOR MOLDING
CUP-SHAPED BODIES
Lawrence J. Gehl, Corning, N.Y., assignor to Corning Glass Works, Corning, N.Y., a corporation of New York
Filed Aug. 18, 1961, Ser. No. 132,335
7 Claims. (Cl. 18—16.5)

This invention relates to apparatus for and the method of molding a unitary cup-shaped body with wires comolded in and passing generally horizontally through the base of the body from an external side surface to the inside surface of the base.

Attempts to produce a satisfactory and economical housing for semiconductor devices resulted in the design of a cup-shaped base in which a plurality of conducting lead wires were to be comolded in and extended horizontally through the sidewall of the base to form a unitary structure, as disclosed in copending U.S. patent application Serial No. 76,046 by William C. Smith, filed December 15, 1960, and assigned to the assignee of this application. In manufacturing the comolded base and wires, it was desired to make it from granular or powdered ceramic material, either vitreous or crystalline, and which is known to be an easily molded material. However, no known molding apparatus was found capable of manufacturing this cup-shaped base from powdered ceramic moldable material with horizontally comolded wires therein.

It is, accordingly, an object of this invention to provide an apparatus and a method for comolding wires and powdered or granular moldable material to form a unitary cup-shaped body with the wires passing generally horizontally through the base of the body from an external side surface to the inside surface of the base.

While the present invention is especially useful for molding the unitary cup-shaped articles from powdered ceramic material, it can also be employed for forming a similar article from other suitable powdered or granular material, such as metal, carbon and the like, when so desired.

Figure 1:
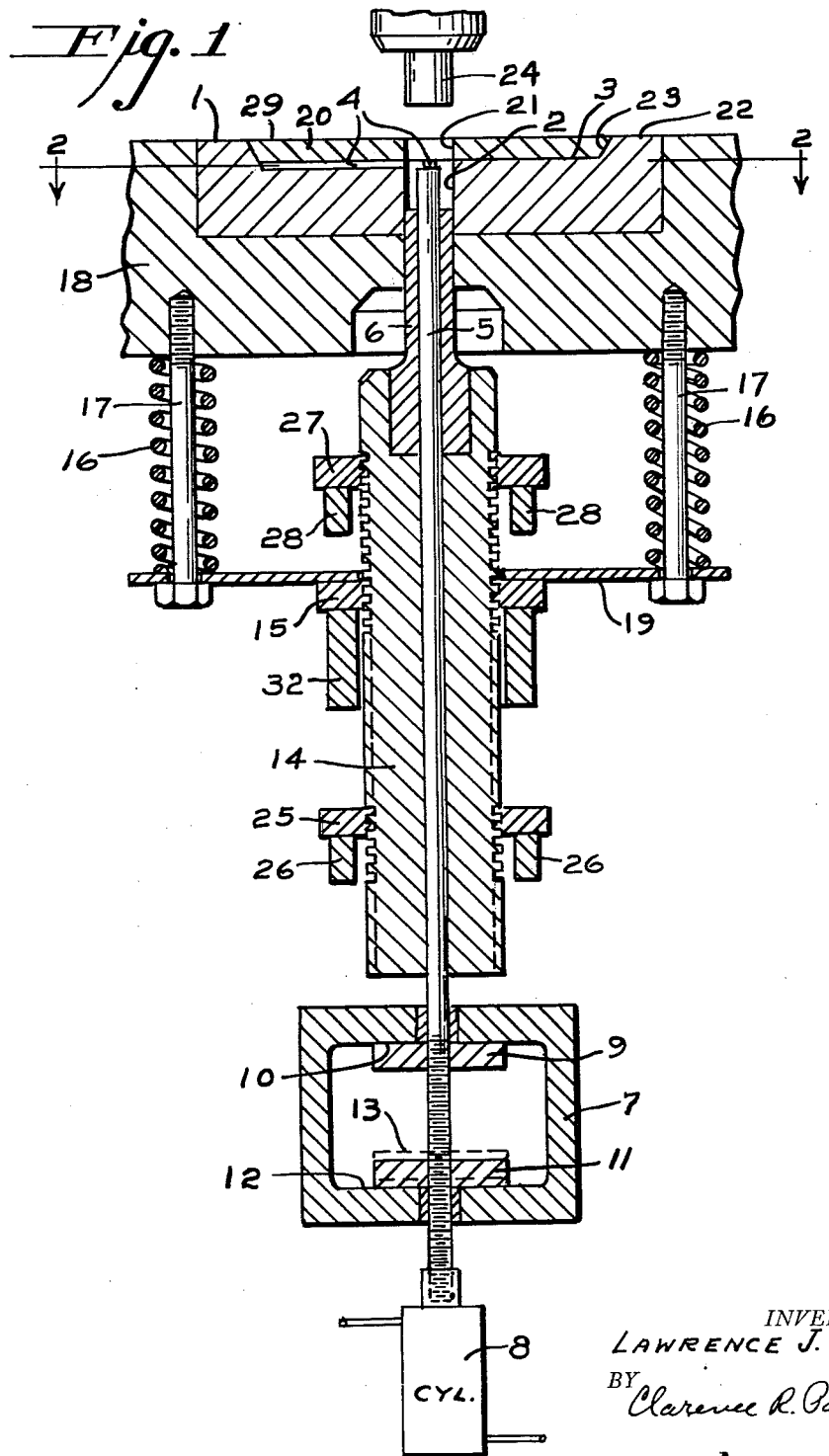
Figure 2:
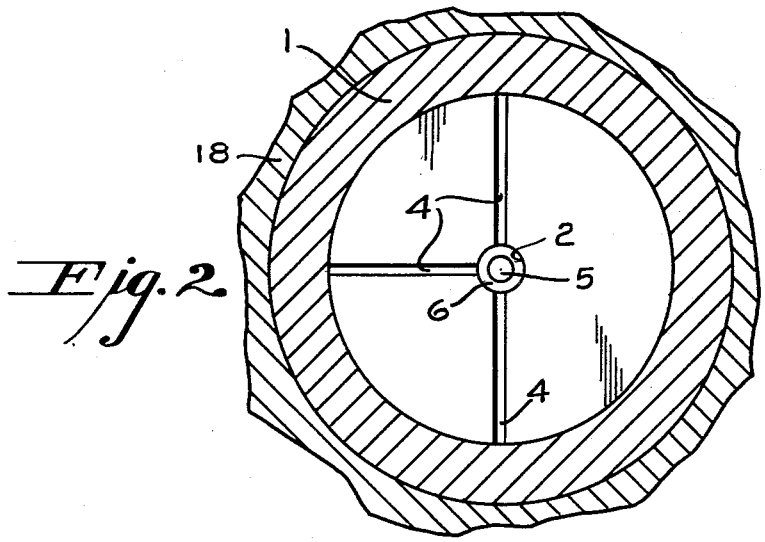
Figures 3, 4:
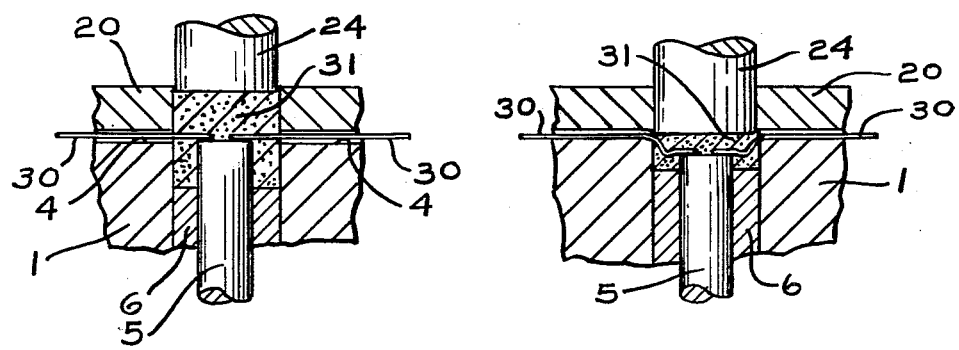

The present invention may be best understood by reference to the accompanying drawings wherein:

FIG. 1 is a fragmentary, sectional, front elevation of a preferred embodiment of a molding press assembly according to the present invention, FIG. 2 is a sectional plan view of the open-top die block taken on line 2—2 of FIG. 1, FIG. 3 is a fragmentary vertical section of the mold assembly showing the moldable material and wires at the beginning of the compression stroke, FIG. 4 is a fragmentary vertical section of the mold assembly showing the molded material and wires at the end of the compression stroke.

Referring to FIGS. 1 and 2, the molding assembly comprises a die block 1 with a vertical bore defined by the cylindrical wall 2. The top surface 3 of die block 1 contains grooves 4 communicating with the vertical bore. An annular mold cavity is defined by the cylindrical wall 2 of the vertical bore, core member 5 and axially movable surrounding means, or tubular ram 6.

A threaded lower end of core member 5 extends through hollow structure 7, formed in a conventional molding press frame (not shown), and is connected to air cylinder 8. Air cylinder 8 is suitably mounted on the base of the molding press frame (not shown). Adjustable nut 9 is mounted on the threaded portion of core member 5 passing through the hollow in structure 7. Nut 9 is adjusted to position the top end of core member 5 at the bottom level of grooves 4 when nut 9 is forced upwardly by air cylinder 8 and against surface 10 on structure 7.

Adjustable nut 11 is also mounted on the threaded portion of core member 5 passing through the hollow in structure 7, but below nut 9. If it is desired to maintain core member 5 stationary during the compression stroke, nut 11 is adjusted downward on core member 5 until nut 9 is forced against surface 10 and nut 11 is pressed against surface 12 of structure 7. Where it is desired to downwardly displace core member 5 a limited distance during the compression stroke, nut 11 is adjusted upwardly a suitable distance away from surface 12 when nut 9 is forced against surface 10 by air cylinder 8. The latter position of nut 11 is indicated by the dotted line 13.

Tubular ram 6 has a rigidly connected tubular extension 14, which surrounds core member 5. An adjustable nut 15 is mounted on an upper threaded portion of extension 14. Nut 15 normally rests on the cylindrical supporting structure 32, which surrounds extension 14 and is a portion of the molding press frame (not shown). The top end of tubular ram 6 is normally positioned at an appropriate level below the top end of core member 5 by adjusting nut 15.

Tubular ram 6 and nut 15 are resiliently maintained in their normal position by means of springs 16, which are arranged around support rods 17. The upper ends of rods 17 are rigidly attached to the underside of press table 18, which rigidly holds die block 1 in its upper surface. The lower ends of rods 17 pass through holes in plate 19. Plate 19 is arranged around extension 14 and rests on the upper surface of nut 15. Springs 16 engage the bottom surface of press table 18 and the top surface of plate 19, thereby urging nut 15 downwardly to its normal rest position.

Circular die member 20 has a passage therethrough defined by cylindrical wall 21, the diameter of which is the same as that of the vertical bore in die block 1. Die member 20 is arranged over top surface 3 of die block 1 so that cylindrical wall 21 is in register with cylindrical wall 2. The passage in die member 20 provides increased mold cavity capacity for moldable material to form the base of the cup-shaped body.

One convenient means of rigidly positioning die member 20 is provided by the raised peripheral portion 22 on the top surface of die block 1. Raised portion 22 has a surface 23 adapted to receive and rigidly position die member 20 on top of recessed surface 3. However, it will be recognized by those skilled in the art that other suitable positioning means may be utilized if desired.

Plunger 24 comprises a conventional solid cylinder adapted to enter the upper part of the mold cavity, as defined by the passage in die member 20, by conventional cam operating means (not shown) for compression of a charge of moldable material placed in the mold cavity.

When additional compression is desired in the annular portion of the mold cavity, tubular ram 6 can be advanced upwardly simultaneously with the downward advance of plunger 24 within the mold cavity. For this purpose, adjustable nut 25 is mounted on the lower threaded portion of extension 14. Conventional cam operated lever arms 26 engage the bottom surface of nut 25 on two opposite sides to effect the upward movement of ram 6 during compression.

Means for ejecting the molded body from the mold cavity comprises an adjustable nut 27 mounted on the upper threaded portion of extension 14 and conventional cam operated lever arms 28, the latter engaging the bottom surface of nut 27 on two opposite sides to effect the upward movement of ram 6 after the compression cycle is completed and plunger 24 is withdrawn from the mold cavity. Nut 27 is adjusted so that the top end of ram 6 is advanced upwardly to at least the level of surface 3.

Suitable arrangement of conventional cam operating means for effecting appropriate motions to plunger 24 and ram 6, and for timing the sequence of the motions, may be substantially as taught in U.S. Patent 2,499,980.

The operation of the molding press assembly of the invention is best described in connection with the novel comolding method for forming the above described unitary cup-shaped body. Initially, die member 20 is removed by suitable means (for example, it can be removed manually by providing a handle means on the top surface 29 of die member 20). Air cylinder 8 is actuated to position the top of core member 5 at the bottom level of grooves 4. Although core member 5 can be maintained stationary during compression, it is preferred to allow a small downward displacement by adjusting nut 12 upward an appropriate distance to a position represented by dotted line 13. Nut 15 is adjusted to provide the proper amount of fill space in the annular portion of the mold cavity that will yield the desired height of the compressed cup-shaped body. When it is desired to give greater strength to the annular wall of the cup-shaped body, lever arms 26 are connected to conventional cam operating means to provide upward advancement of ram 6 during compression and nut 25 is adjusted so that during compression the top end of core member 5 remains the desired distance above the top end of ram 6 to yield the desired height of the annular wall of the cup-shaped body.

The first step of the method consists of positioning straight pieces of wire horizontally through radially spaced openings in the sidewall of an open top mold and in a plane intermediate the top and bottom of the cavity formed by the mold. Thus, the straight pieces of wire are placed in grooves 4 and die member 20 is replaced on top of surface 3.

Next, the wire pieces are extended horizontally into the cavity so that their innermost ends rest on and are supported by the core member 5. This step may be conveniently performed simultaneously with the first step by providing wire pieces of appropriate length to occupy the entire length of grooves 4 from surface 23 and to extend onto the top surface of core member 5. When utilizing this method to produce a semiconductor housing base as disclosed in the aforementioned application Serial No. 76,046, the innermost ends of the wire pieces resting on core member 5 are suitably spaced apart as shown in the copending application.

When the positioning and extending of the wire pieces is completed, the entire mold cavity (including the annular portion) is filled with a charge of granular molding material by conventional means (for example, as shown in U.S. Patent 2,499,980) and customarily up to the level of surface 29. Then the charge of molding material is compressed within the cavity and, preferably concurrently therewith, the portion of the wire pieces within the cavity are downwardly displaced so that they pass through the base of the cup-shaped body generally diagonally from spaced points near the bottom edge of the external side surface of the base to the inner surface of the base and thence flush with the inner surface.

The preferred concurrent compressing and displacing steps are best understood by referring to FIGS. 3 and 4. At the beginning of the compression stroke, as shown in FIG. 3, wire pieces 30 are in their initial position and the entire mold cavity is filled with granular moldable material 31. Plunger 24 is on the down stroke and is just entering the passage in die member 20. At this point, tubular ram 6 is just beginning its upward advancement. FIG. 4 shows plunger 24 and ram 6 at the end of their compression strokes with the resultant compression of the moldable material 31 into a cup-shaped body and with the concurrent displacement of the wire pieces 30 to the aforementioned generally diagonal position within the base of the body. In effecting the concurrent compression and displacement, core member 5 has been displaced downwardly to its lower limit as determined by nut 12 and against the resilient upward pressure effected by air cylinder 8. If the downward displacement of the wire pieces is not desired, core membr 5 should be maintained stationary.

At the end of the compression stroke, the pressure effected by air cylinder 8 is released before plunger 24 is withdrawn to prevent core member 5 from breaking through the central portion of the base of the cup-shaped body as a result of the annular wall of the cup-shaped body sticking to the mold cavity wall. Then plunger 24 is withdrawn and die member 20 is removed. Ejection of the molded, unitary, cup-shaped body is subsequently effected by causing lever arms 28 to upwardly advance ram 6.

The assembly is made ready for molding another body by lowering lever arms 26 and 28 to their initial position whereby ram 6 is returned to its normal position by means of spring 16. Air cylinder 8 is again actuated to position the top of core member 5 at the bottom level of grooves 4.

While the foregoing apparatus and method have been described with the use of a plurality of grooves 4 and a similar plurality of wire pieces 30, it will be appreciated that only one groove and one wire piece may be provided, if desired for any particular purpose. In the preferred embodiment for producing a semiconductor housing base, as best shown in FIG. 2, three grooves, each spaced substantially radially 90° from another one, are provided for three wire pieces to be comolded in the unitary cup-shaped body.

The depth and width of grooves 4 are preferably proportioned to closely fit the cross-sectional dimensions of the desired wire pieces used.

Any suitable combination of granular moldable material and metal or alloy can be used for the body and wire pieces, respectively. A preferred combination used for the semi-conductor housing base is glass of the composition disclosed in copending U.S. patent application Serial No. 824,369 by R. H. Dalton, filed July 1, 1959, and assigned to the assignee of this application, which is ground to a finely divided powder, and platinum metal in the form of flat thin wire.

It should be understood that the illustrated embodiments of the invention may be varied in their details within the spirit of the invention. Accordingly, it is intended that the scope of the present invention be limited only by the appended claims.

What is claimed is:

1. In a molding press, an assembly useful in pressing from moldable granular material a unitary cup-shaped body with at least one wire passing through the base of said body generally horizontally from the external side surface of said base to the inner surface of said base and thence flush with said inner surface, comprising a stationary die block having a vertical bore therethrough and at least one groove in the top surface of said block extending substantially radially from and communicating with said bore, said groove adapted to loosely hold a piece of wire in predetermined position with a portion extending into said bore, means positioned in and cooperating with said bore to define an annular mold cavity comprising a core member with means for normally positioning the top end of said core member at the bottom level of said groove to thereby form a support for the end of the extending portion of said wire and axially movable surrounding means with means for normally positioning the top end of said surrounding means at a level below the top end of said core member, means for restricting downward displacement of said core member and said axially movable surrounding means during compression of said moldable material, means arranged over the top of said die block for loosely holding said wire in said groove and having a passage therethrough of the diameter of said bore in register therewith thereby increasing the mold cavity capacity for moldable material to form said base, and means for compressing a charge of moldable material and wire placed in said mold cavity.

2. The assembly of claim 1 including means for advancing upwardly said surrounding means during compression to a level where its top end is below the top end of said core member.

3. The assembly of claim 1 wherein the top surface of said die block has a plurality of grooves communicating with and extending substantially radially from said bore.

4. The assembly of claim 3 having three grooves, each being spaced substantially radially 90° from another one of said grooves.

5. The assembly of claim 1 including means for advancing upwardly said surrounding means to at least the level of the top surface of said die block to effect ejection of the molded body from the mold cavity.

6. The assembly of claim 1 including a raised peripheral portion on the top surface of said die block surrounding and defining a recessed portion of said surface having said at least one groove therein, said peripheral portion adapted to receive and rigidly position said means arranged over the top of said die block on said recessed portion.

7. In a molding press, an assembly useful in pressing from moldable granular material a unitary cup-shaped body with a plurality of wires passing through the base of said body generally diagonally from spaced points near the bottom edge of the external side surface of said base to the inner surface of said base and thence flush with said inner surface, comprising a stationary die block having a vertical bore therethrough and a plurality of grooves in the top surface of said block communicating with and extending substantially radially from said bore, each of said grooves adapted to loosely hold a piece of wire in predetermined position with a portion extending into said bore, means positioned in and cooperating with said bore to define an annular mold cavity comprising a resiliently, downwardly displaceable core member with means for normally positioning the top end of said core member at the bottom level of said grooves to thereby form a support for the ends of the extending portions of said wires and axially movable surrounding means with means for normally positioning the top end of said surrounding means at a level below the top end of said core member, means for restricting downward displacement of said core member and means for advancing upwardly said surrounding means during compression of said moldable material to levels where the top end of said core member remains above the top end of said surrounding member, means arranged over the top of said die block for loosely holding said wires in said grooves and having a passage therethrough of the diameter of said bore in register therewith thereby increasing the mold cavity capacity for moldable material to form said base, means for compressing a charge of moldable material and wires placed in said mold cavity and for concurrently depressing the extending portion of said wires to said generally diagonal position with the depression of said core member as compression of the charge is being effected, and means for advancing upwardly said surrounding means to at least the level of the top surface of said die block to effect ejection of the molded body from the mold cavity.

References Cited in the file of this patent

UNITED STATES PATENTS

| | | |
|---|---|---|
| 405,655 | Baum | June 18, 1889 |
| 1,120,291 | Davis | Dec. 8, 1914 |
| 1,609,427 | Queneau | Dec. 7, 1926 |
| 1,648,721 | Claus | Nov. 8, 1927 |
| 1,813,576 | Kattwinkel | July 7, 1931 |
| 1,914,004 | Brasket | June 13, 1933 |
| 1,922,527 | Daniel | Aug. 15, 1933 |
| 2,166,205 | Anderson | July 18, 1939 |
| 2,821,748 | Willi | Feb. 4, 1958 |
| 3,009,578 | Foote et al. | Nov. 21, 1961 |

FOREIGN PATENTS

| | | |
|---|---|---|
| 1,129,497 | France | Jan. 22, 1957 |